US007275604B1

(12) United States Patent
Wall

(10) Patent No.: US 7,275,604 B1
(45) Date of Patent: Oct. 2, 2007

(54) MULTI-ZONE FIREWALL DETECTION SYSTEM

(76) Inventor: Terry M. Wall, P.O. Box 815, Bella Vista, CA (US) 96008

(*) Notice: Subject to any disclaimer, the term of this patent is extended or adjusted under 35 U.S.C. 154(b) by 15 days.

(21) Appl. No.: 11/247,933

(22) Filed: Oct. 12, 2005

(51) Int. Cl.

| | |
|---|---|
| *A62C 37/10* | (2006.01) |
| *A62C 37/11* | (2006.01) |
| *A62C 37/36* | (2006.01) |
| *A62C 37/44* | (2006.01) |
| *A62C 35/00* | (2006.01) |
| *A01G 25/02* | (2006.01) |
| *A01G 25/16* | (2006.01) |

(52) U.S. Cl. ............................ 169/60; 169/16; 169/48; 169/61; 239/66; 239/69; 239/75; 239/207; 239/DIG. 15

(58) Field of Classification Search .................. 169/60, 169/61, 48, 16, 5, 7, 13, 54, 56; 239/66, 239/67, 69, 75, 207, DIG. 15, 201, 203, 204, 239/208, 536, 565, 569
See application file for complete search history.

(56) References Cited

U.S. PATENT DOCUMENTS

| | | | | |
|---|---|---|---|---|
| 3,576,212 | A | 4/1971 | Siler | |
| 3,583,490 | A | 6/1971 | McFadden | |
| 4,428,434 | A | 1/1984 | Gelaude | |
| 5,165,482 | A | 11/1992 | Smagac et al. | |
| 5,692,571 | A | 12/1997 | Jackson | |
| 6,109,361 | A * | 8/2000 | Henderson | 169/54 |
| D437,387 | S | 2/2001 | Hui-Chen | |
| 6,360,968 | B1 * | 3/2002 | Orrange et al. | 239/273 |
| 6,523,616 | B1 * | 2/2003 | Wallace | 169/70 |
| 6,629,569 | B1 * | 10/2003 | Adams | 169/56 |
| 6,679,337 | B1 * | 1/2004 | Perry et al. | 169/16 |
| 6,685,104 | B1 * | 2/2004 | Float et al. | 239/63 |
| 6,772,562 | B1 * | 8/2004 | Dadamo | 52/1 |
| 6,827,288 | B2 * | 12/2004 | Noelke | 239/124 |
| 2004/0150522 | A1 * | 8/2004 | Krause | 340/567 |

* cited by examiner

*Primary Examiner*—Darren Gorman

(57) ABSTRACT

A sprinkler system includes a control panel including a processor, a power supply source, and a memory including software instructions for automatically toggling the system between operating and non-operating modes. The control panel includes controls mated to the processor that generate and transmit a user input control signal thereto. The processor executes a control algorithm for enabling the user to override the system. Sensors are spaced along a perimeter of the building structure, are camouflaged and shaped as an outdoor ornamental lawn art such as insects and amphibians, and generate and transmit an RF detection signal to the control panel, identifying an ambient temperature. Lawn and fire sprinkler assemblies are positioned about the building structure. The lawn and fire sprinkler assemblies are mated to the control panel and are independently operable. The sensors automatically instruct the control panel to activate and deactivate the lawn and fire sprinkler assemblies when a threshold exceeding ambient temperate is detected.

15 Claims, 9 Drawing Sheets

MULTI-ZONE FIREWALL DETECTION SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to fire detection systems and, more particularly, to a camouflaged thermo-sensitive multi-zone fire detection system for protecting a building structure from wildfire damage.

2. Prior Art

It is a problem for rural homeowners to protect their property from the danger of wildfires. There is an increasing trend for people to build their homes in locations that are within what is called the wild-land/urban interface. This is a term that describes the border zone where structures, mainly residences, are built in wild-land areas that by nature are subject to fires. The wild-land/urban interface describes the geographical areas where formerly urban structures, mainly residences, are built in close proximity to flammable fuels naturally found in wild-land areas, including forests, prairies, hillsides and valleys. To the resident, the forest represents a beautiful environment but to a fire the forest represents a tremendous source of fuel. Areas that are popular wild-land/urban interfaces are the California coastal and mountain areas and the mountainous areas in Colorado (among others).

Residences built in these areas tend to be placed in locations that contain significant quantities of combustible vegetation and the structures themselves have combustible exterior walls and many have untreated wood roofs. Many of these houses are also built on sloping hillsides to obtain scenic views; however, slopes create natural wind flows that increase the spread of a wildfire. These homes are also located a great distance away from fire protection equipment and typically have a limited water supply, such as a residential well with a minimal water flow in the range of one to three gallons per minute.

Given this collection of factors, a wildfire entering this area is very difficult to control. Wildfire can reach an intensity that causes uncontrollable and rapid spread due to spotting, which occurs as wind-borne burning embers are carried far ahead of the main fire front and land in receptive fuels. These embers can fall on the roofs of houses, on woodpiles or can start new fires in the vegetation surrounding a structure while firefighters are occupied elsewhere with the main fire.

All prior art residential firefighting systems are grossly inadequate to deal with wildfires in the wild-land/urban interface area. One of the most significant failings of all of these prior art fire fighting systems is that they are reactive by nature and serve to attempt to extinguish a fire that has begun on the roof of a structure. Due to the limited supply of water in the homes in a wild-land/urban interface, such a method of defense is impractical as it can deliver a very limited amount of water to the structure that is ablaze. In addition, the intensity of a wildfire quickly overwhelms these limited fire extinguishing measures since they are activated once the structure is on fire and/or the wildfire has reached the structure. Many of these prior art systems operate in a preemptive manner and do not provide any environmental dependent measures to prevent the initiation of the fire or to thwart its spread.

Accordingly, a need remains for a thermo-sensitive multi-zone fire detection system in order to overcome the above-noted shortcomings. The present invention satisfies such a need by providing a fire detection system that is easy to install, versatile in use and provides improved protection to rural residences. Such a system provides fast and effective means for saturating a structure and the surrounding vegetation, thereby preventing it from being engulfed in an advancing wildfire. The small size of the system components, as well as the decorative nature thereof, makes it comparatively unobtrusive, thereby preventing it from detracting from the appearance of a structure. Such an automated system eliminates the need for the owner to remain in a fire threatened area in order to activate the system. The system also provides and effective and efficient means of watering lawns and other ornamental vegetation.

BRIEF SUMMARY OF THE INVENTION

In view of the foregoing background, it is therefore an object of the present invention to provide a multi-zone fire detection system. These and other objects, features, and advantages of the invention are provided by a camouflaged thermo-sensitive sprinkler system for protecting a building structure from wildfire damage.

The thermo-sensitive sprinkler system includes a control panel including a processor and a memory including programmable software instructions that cause the sprinkler system to automatically toggle between operating and non-operating modes when a fire is detected at the building structure. Such a control panel further includes a plurality of controls electrically mated to the processor. The controls generate and transmit a control signal to the processor based upon a user input. Such a processor executes a control algorithm embedded within the software instructions for enabling the user to manually override the sprinkler system as needed. The control panel also includes an internal power supply source.

A plurality of sensors are sequentially spaced along a perimeter of the building structure. Such sensors preferably include thermoelectric sensors for measuring an ambient temperature surrounding the building structure. For example, when the ambient temperature reaches 170 degrees Fahrenheit and above, the sensors will generate a detection signal (described hereinbelow). Each sensor is camouflaged and shaped as an outdoor ornamental lawn art such as insects and amphibians for advantageously and effectively blending into a surrounding environment. Such sensors generate and wirelessly transmit a detection signal to the control panel wherein the detection signal includes an RF signal embedded with a data stream that effectively identifies when ambient temperature surrounding the building structure exceeds 170 degrees Fahrenheit. Each sensor preferably includes a housing provided with a linear threaded bore and an elongated and linear stake removably inserted below ground level and pivotally connected to the housing. The housing is adaptable along an arcuate path above the ground level while the stake remains statically positioned below ground level.

A plurality of lawn sprinkler assemblies are selectively positioned at predetermined locations about the perimeter of the building structure. Such lawn sprinkler assemblies preferably include a plurality of one-way shut-off valves located down stream of a main water supply line and a plurality of sprinkler heads in fluid communication with the shut-off valves respectively. The sprinkler heads are selectively positioned in a plurality of zones defined about the perimeter of the building structure. Each zone is directly operable by an associated one of the shut-off valves such that selected ones of the zones can advantageously and conveniently be activated as needed.

A plurality of fire sprinkler assemblies are selectively positioned at predetermined locations about the perimeter of the building structure. Such fire sprinkler assemblies preferably include a plurality of one-way shut-off valves located down stream of a main water supply line and a plurality of sprinkler heads in fluid communication with the shut-off valves respectively. The sprinkler heads are selectively positioned in a plurality of zones defined about the perimeter of the building structure. Each zone is directly operable by an associated one of the shut-off valves such that selected ones of the zones can advantageously and conveniently be activated as needed.

Such lawn sprinkler assemblies and fire sprinkler assemblies are electrically mated to the control panel and are further independently operable during emergency and non-emergency situations. Each sensor is in communication with the control panel such that the sensors can advantageously automatically instruct the control panel to activate and deactivate the lawn and fire sprinkler assemblies when an ambient temperate is detected to be higher than a maximum threshold temperature surrounding the building structure. The lawn shut-off valves are preferably connected in series and isolated from the fire shut-off valves such that the lawn and fire shut-off valves can effectively be independently operated and thereby advantageously allow corresponding ones of the zones to be independently operated.

The system may further include at least one elongated and conductive cable including a plurality of female couplings electrically mated thereto and laterally extending away from the cable. Such a cable further includes a male coupling electrically mated thereto. A female receptacle is directly mateable to the male coupling of the cable such that spaced ones of the sensors can effectively be powered by associated ones of the cable. A male receptacle is electrically coupled to the threaded bore and removably mateable with one female coupling of the cable. Such female couplings may include a cap removably attached directly to a receiving face of the female couplings for advantageously and effectively shielding the female couplings from undesirable debris during non-operating conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
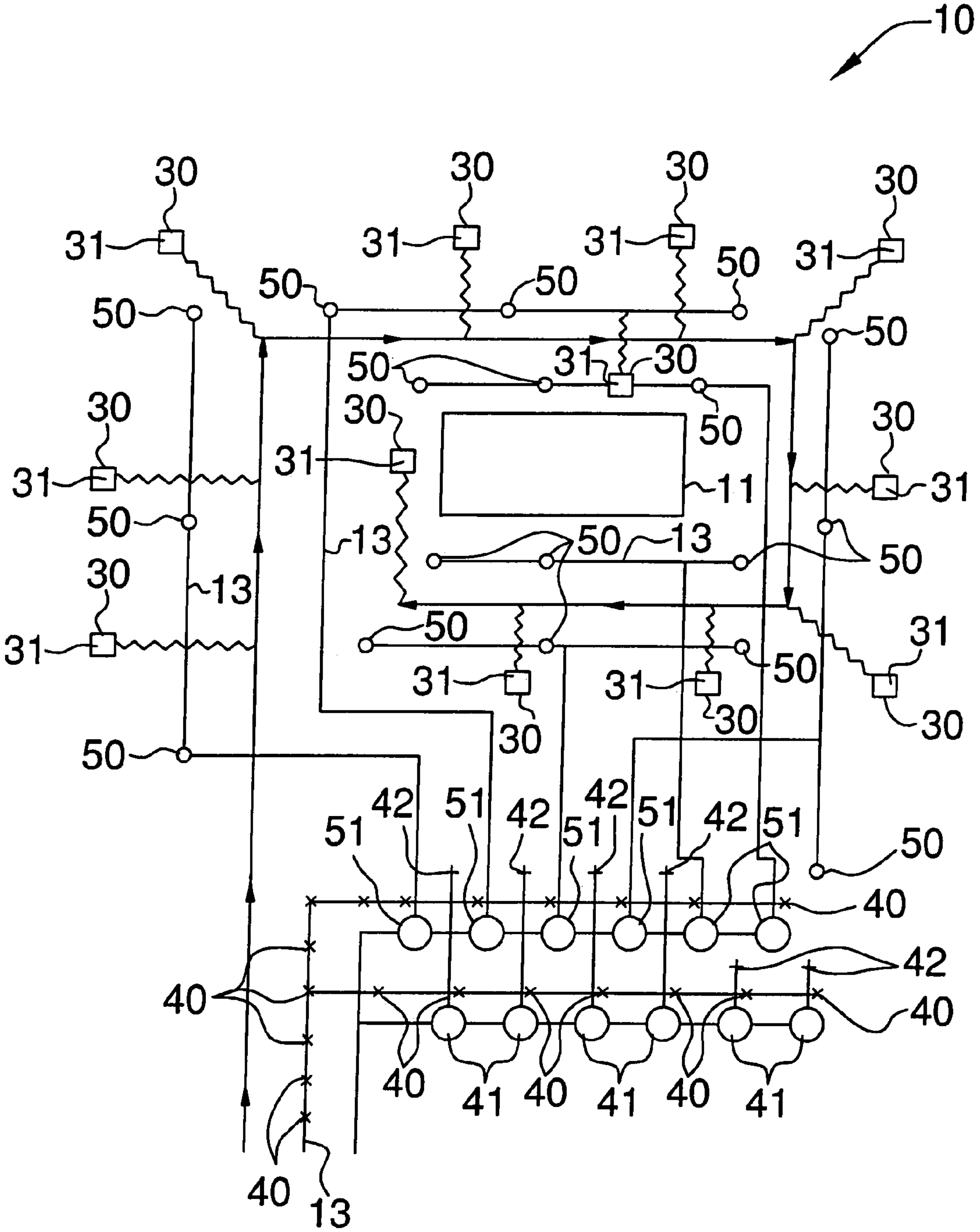
FIG. 1 is a schematic block diagram showing a thermo-sensitive multi-zone fire detection system, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures.

The system of this invention is referred to generally in FIGS. 1-12 by the reference numeral 10 and is intended to provide a thermo-sensitive multi-zone fire detection system. It should be understood that the system 10 may be used to detect fires in many different types of settings and should not be limited in use to only rural residences and buildings.

Figure 3:
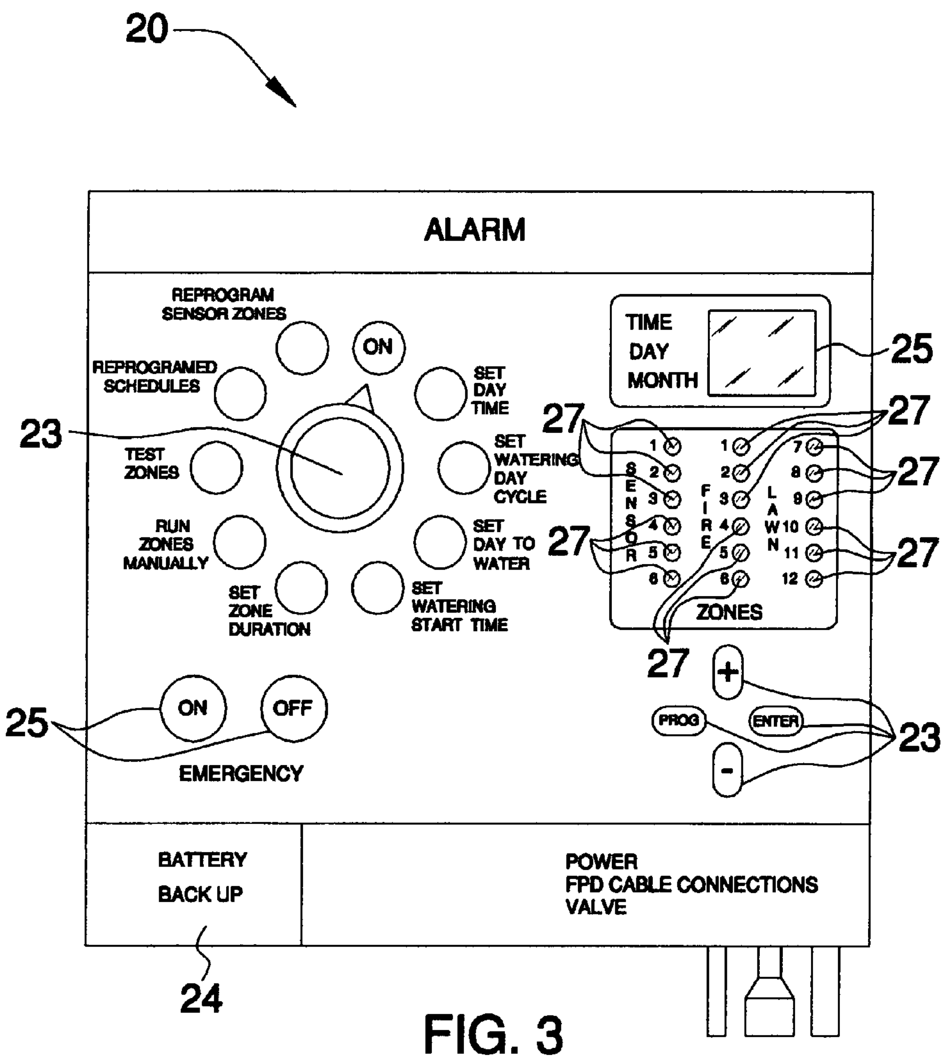
FIG. 3 is a top plan view showing a control panel, in accordance with the present invention.
Figure 4:
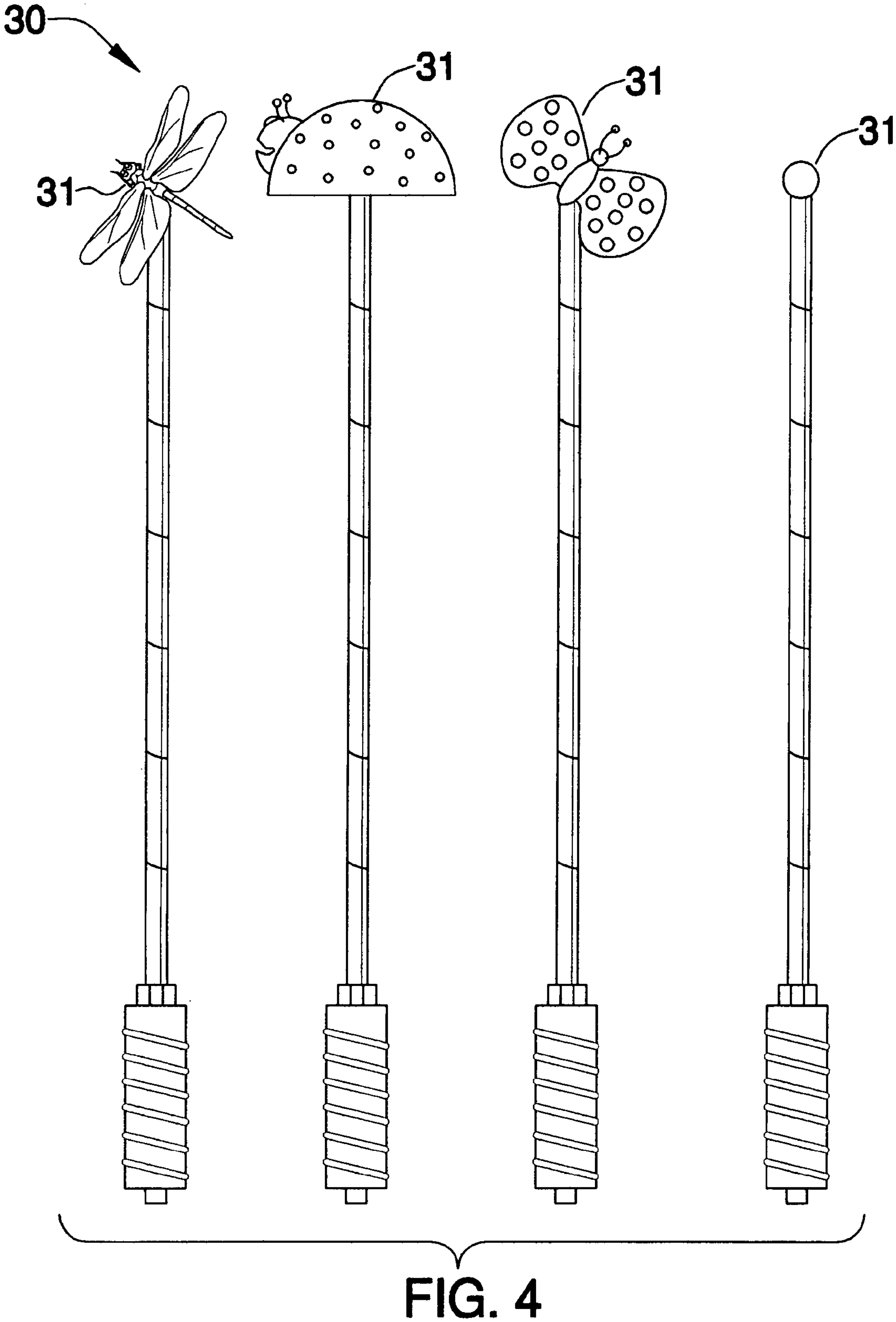
FIG. 4 is a side-elevational view showing a plurality of alternately camouflaged thermo sensors, in accordance with the present invention.
Figure 5:
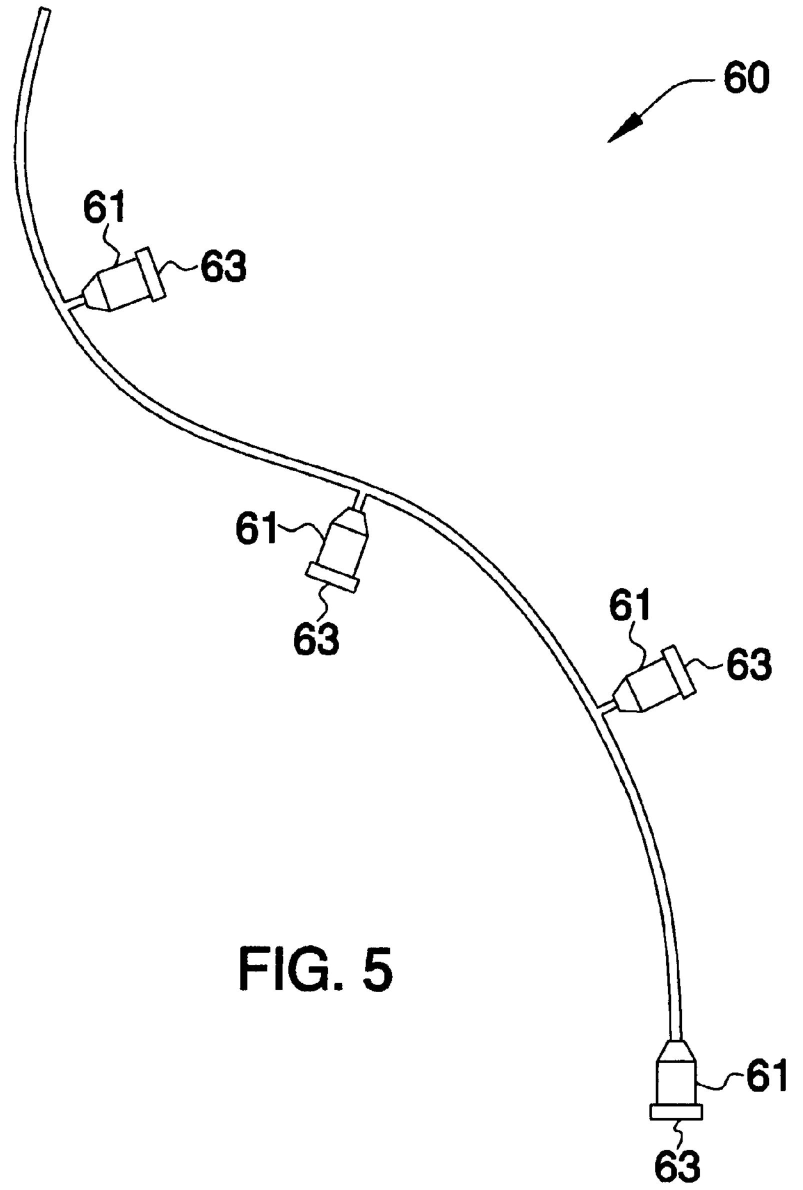
FIG. 5 is a top plan view of the elongated conductive cable shown in FIG. 2.
Figure 6:
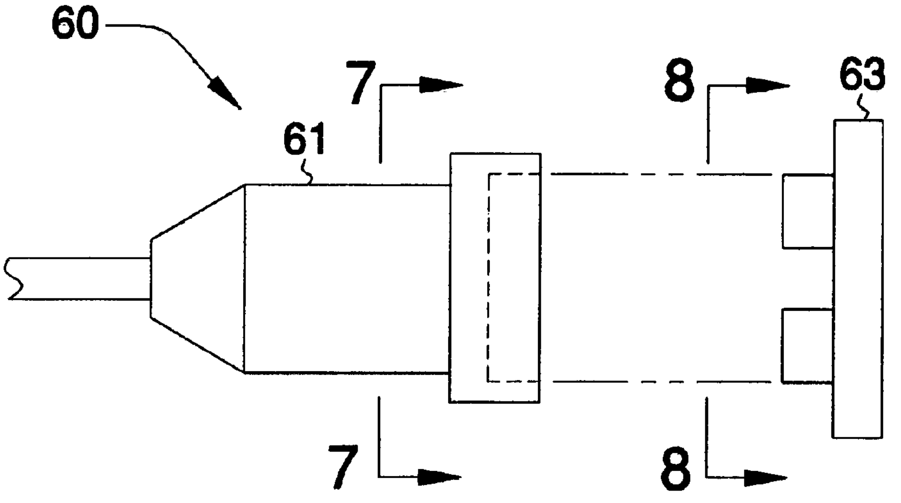
FIG. 6 is an enlarged side-elevational view of a female coupling and its associated cap as shown in FIG. 2.
Figure 7:
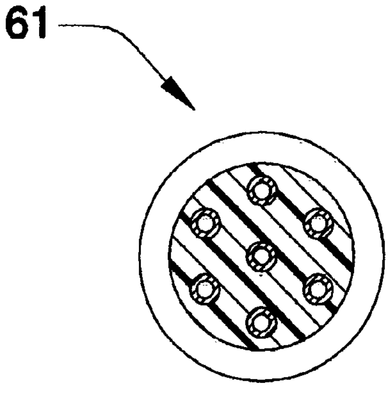
FIG. 7 is a cross-sectional view of the female coupling shown in FIG. 6, taken along line 7-7.
Figure 8:
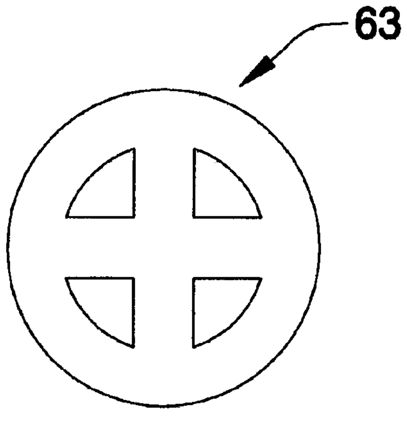
FIG. 8 is a front-elevational view of the cap shown in FIG. 6, taken along line 8-8.
Figure 9:
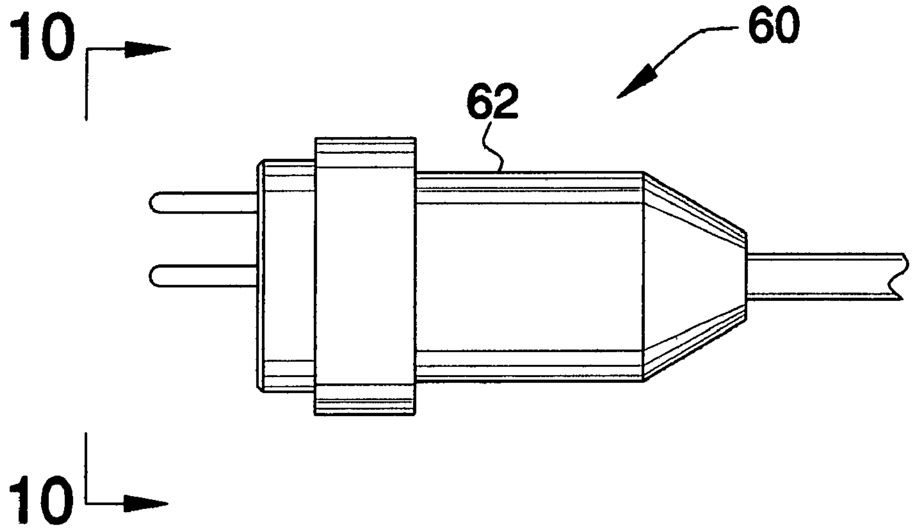
FIG. 9 is an enlarged side-elevational view of the male coupling shown in FIG. 2.
Figure 10:
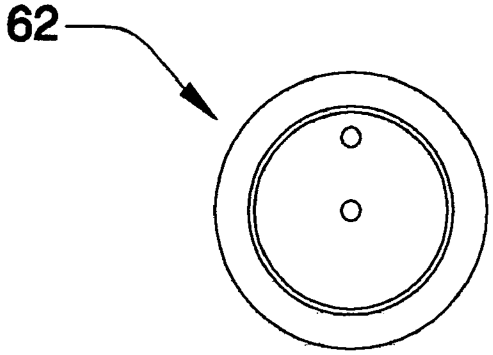
FIG. 10 is a front-elevational view of the male coupling shown in FIG. 9, taken along line 10-10.
Figure 12:
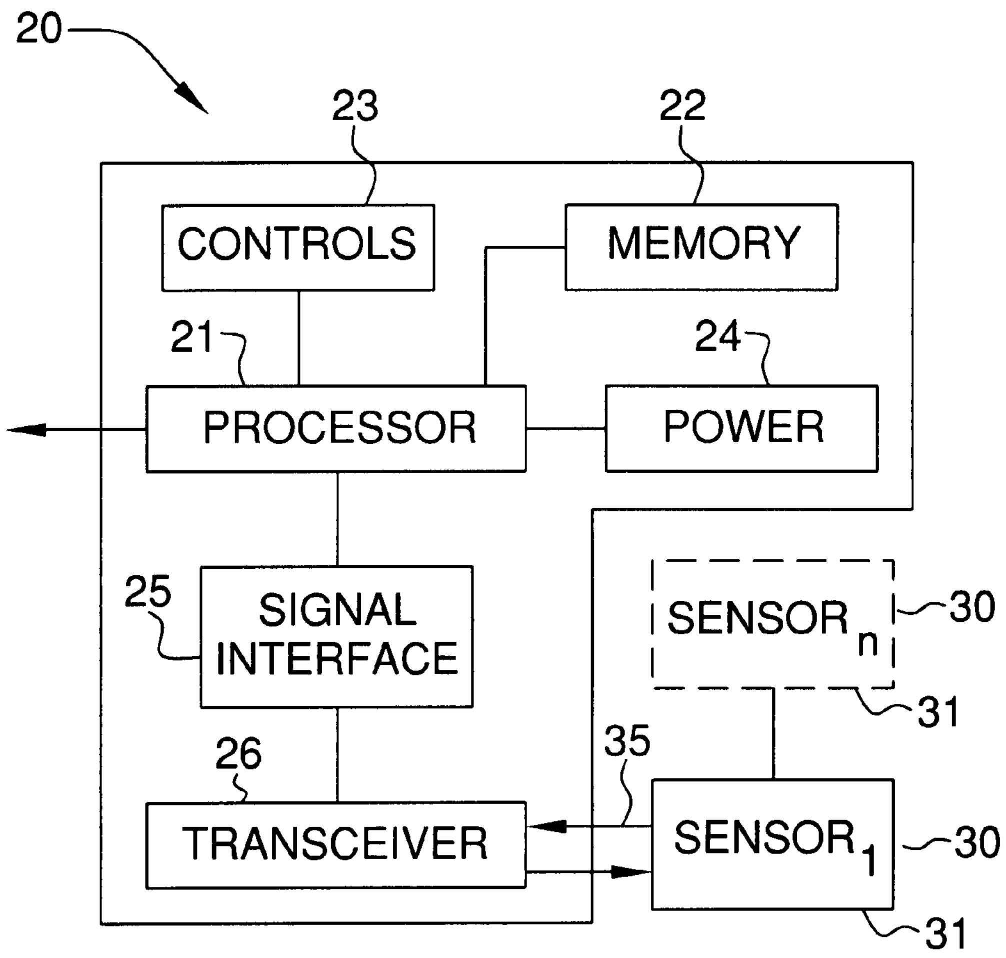
FIG. 12 is a schematic block diagram of the control panel shown in FIG. 3.

Referring initially to FIGS. 1, 3 and 12, the system 10 includes a control panel 20 including a processor 21 and a memory 22 including programmable software instructions that cause the sprinkler system 10 to automatically toggle between operating and non-operating modes when a fire is detected at the building structure. This feature advantageously eliminates the need for a person to manually activate the system 10, thus allowing them to participate in evacuation procedures at an earlier and safer point in time. Such a control panel 20 further includes a plurality of controls 23 electrically mated to the processor 21. The controls 23 generate and transmit a control signal to the processor 21 based upon a user input. Such a processor 21 executes a control algorithm embedded within the software instructions for enabling the user to manually override the sprinkler system 20 as needed. The control panel 20 also includes an internal power supply source 24, which is essential and convenient for powering the system 10 during emergency situations when the city supplied power source has been deactivated. A signal interface 25 is electrically mated to the processor and includes a transceiver 26 electrically connected thereto. Such a signal interface 25 further includes a plurality of LED's 27 that are critical and advantageous for indicating which sensor 30 (described herein below) has been activated.

Referring to FIGS. 1, 2, 4 and 12, a plurality of sensors 30 are sequentially spaced along a perimeter of the building structure 11. Of course, the sensors 30 may be positioned in any other suitable orientation about the building structure 11, as is obvious to a person of ordinary skill in the art. Such sensors 30 include thermoelectric sensors 31 that are vital for measuring an ambient temperature surrounding the building structure 11, thus being able to detect an abnormally high fluctuation in ambient temperatures indicative of an approaching fire. For example, when the ambient temperature reaches 170 degrees Fahrenheit and above, the sensors will generate a detection signal (described hereinbelow). Each sensor 30 is camouflaged and shaped as an outdoor ornamental lawn art such as insects and amphibians for advantageously and effectively blending into a surrounding environment. This is a critical feature for allowing the natural appearance of the surrounding environment of the building structure 11 to be maintained, which is often one of the major reasons for the residents to live there in the first place. Of course, the sensors 30 may be produced in a variety of different shapes, sizes and forms, as is obvious to a person of ordinary skill in the art. Such sensors 30 generate and wirelessly transmit a detection signal 35 to the transceiver 26 of the control panel 20 wherein the detection signal 35 includes an RF signal embedded with a data stream that is important for effectively identifying when the ambient temperature surrounding the building structure 11 has exceeded 170 degrees Fahrenheit.

Still referring to FIGS. 1, 2, 4 and 12, each sensor 30 includes a housing 32 provided with a linear threaded bore 33 and an elongated and linear stake 34 removably inserted below a ground level 12 and pivotally connected to the housing 32. The housing 32 is adaptable along an arcuate path above the ground level 12 while the stake 34 remains statically positioned below ground level 12. The adaptable nature of the housing 32 is critical to the system 10 for allowing a user to adjust the sensors 30 such that the sensors 30 can maximize their temperature measuring capabilities.

Figure 11:
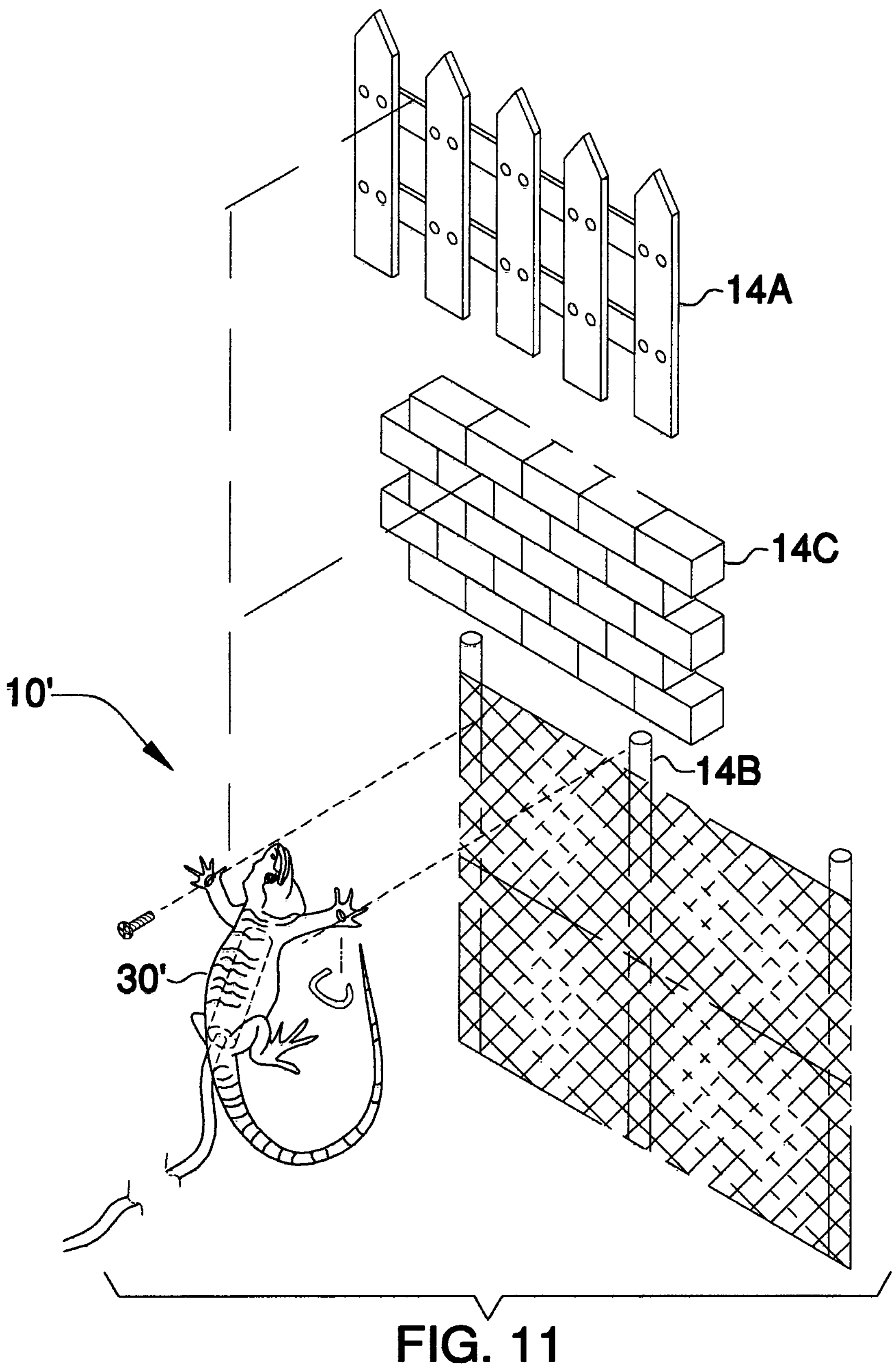
FIG. 11 is a perspective view showing an alternate embodiment for attaching the sensors directly to an upright structure, in accordance with the present invention.

Referring to FIG. 11, in an alternate embodiment 10', the sensors 30' are adapted to be directly connected, without the use of intervening elements, to an upright structure, such as a picket 14A, chain-link 14B or brick 14C fence that may be positioned about a perimeter of the building structure 11. This advantageously allows the system 10' to detect a fire beyond such a fence 14 before the fire spreads too close to the structure 11. This also allows the system 10 to activate the fire sprinkler assemblies 50 (described herein below) in a preemptive manner to douse the building structure 11 and the zones in order to deter the fire from entering.

Referring to FIG. 1, a plurality of lawn sprinkler assemblies 40 are selectively positioned at predetermined locations about the perimeter of the building structure 11. Of course, the lawn sprinkler assemblies 40 may be positioned in any suitable orientation depending on the needs of the user, as obvious to a person of ordinary skill in the art. Such lawn sprinkler assemblies 40 include a plurality of one-way shut-off valves 41 located down stream of a main water supply line 13 and a plurality of sprinkler heads 42 in fluid communication with the shut-off valves 41 respectively. The sprinkler heads 42 are selectively positioned in a plurality of zones defined about the perimeter of the building structure 11. Each zone is directly operable, without the use of intervening elements, by an associated one of the shut-off valves 41, which is essential such that selected ones of the zones can advantageously and conveniently be activated as needed. This feature allows a user to customize their lawn's irrigation schedule, which in turn advantageously allows the system 10 to be employed in various climate regions.

Figure 2:
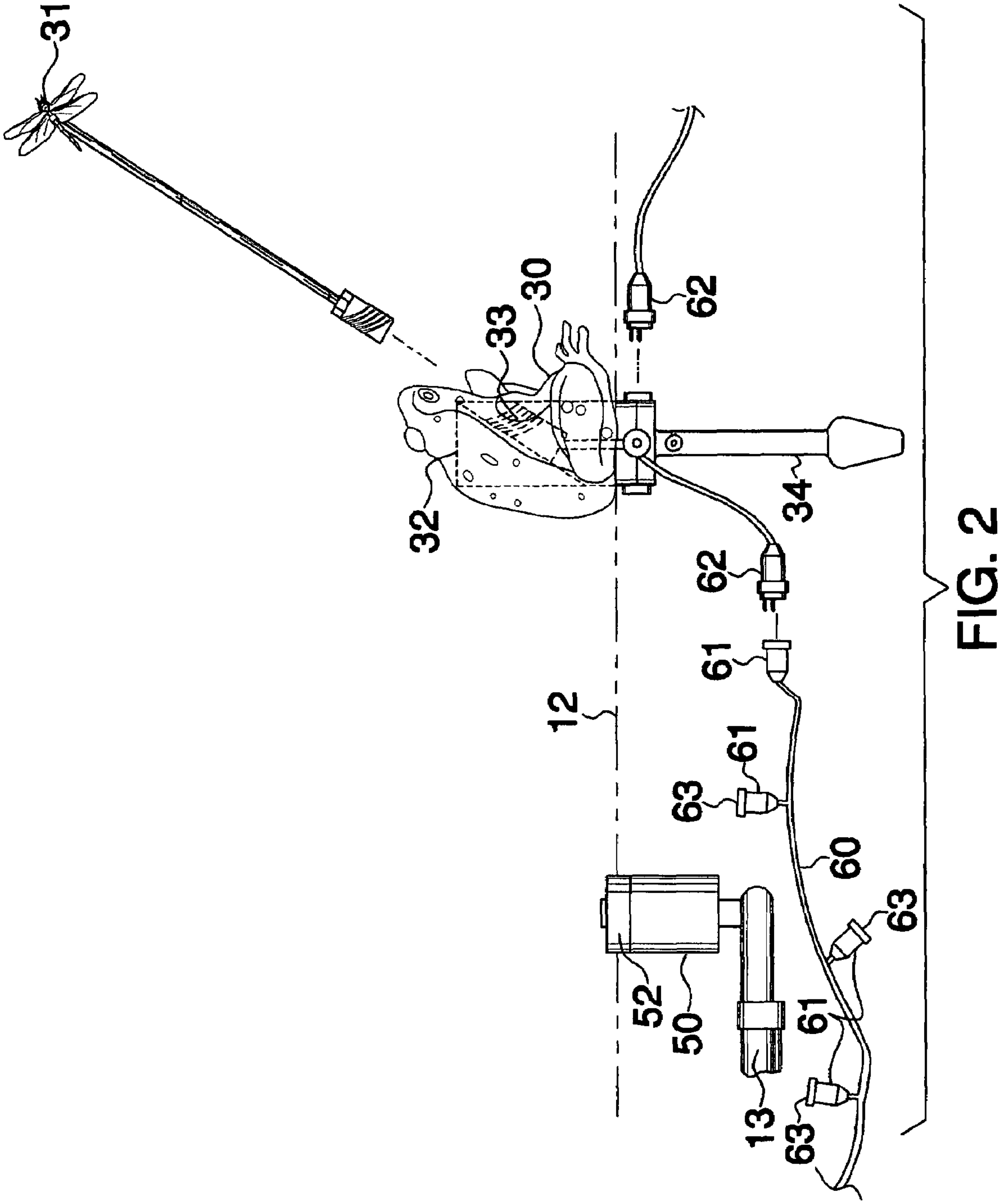
FIG. 2 is a side-elevational view of the system shown in FIG. 1.

Referring to FIGS. 1 and 2, a plurality of fire sprinkler assemblies 50 are selectively positioned at predetermined locations about the perimeter of the building structure 11. Of course, the fire sprinkler assemblies 50 may be positioned to not only dispense water on the areas surrounding the building structure 11, but also onto the structure 11 itself, as is obvious to a person of ordinary skills in the art. Such fire sprinkler assemblies 50 include a plurality of one-way shut-off valves 51 located down stream of a main water supply line 13 and a plurality of sprinkler heads 52 in fluid communication with the shut-off valves 51 respectively.

The sprinkler heads 52 are selectively positioned in a plurality of zones defined about the perimeter of the building structure 11. Each zone is directly operable, without the use of intervening elements, by an associated one of the shut-off valves 51, which is critical such that selected ones of the zones can advantageously and conveniently be activated as needed. This feature advantageously allows the system 10 to focus watering operations in areas that are under a greater threat of fire than other areas of and surrounding the building structure 11. For example, the sprinkler heads 52 may be divided into North, South, East and West zones directly controllable at the control panel.

Still Referring to FIGS. 1 and 2, such lawn sprinkler assemblies 40 and fire sprinkler assemblies 50 are electrically mated to the control panel 20 and are further independently operable during emergency and non-emergency situations. Each sensor 30 is in communication with the control panel 20 such that the sensors 30 can advantageously automatically instruct the control panel 20 to activate and deactivate the lawn 40 and fire 50 sprinkler assemblies when an ambient temperate is detected to be higher than a maximum threshold temperature surrounding the building structure 11. The lawn shut-off valves 41 are connected in series and isolated from the fire shut-off valves 51, which is crucial such that the lawn 41 and fire 51 shut-off valves can effectively be independently operated and thereby advantageously allow corresponding ones of the zones to be independently operated.

Referring to FIGS. 1, 2 and 5 through 10, the system 10 further includes at least one elongated and conductive cable 60 including a plurality of female couplings 61 electrically mated thereto and laterally extending away from the cable 60. Such a cable 60 further includes a male coupling 62 electrically mated thereto. The female receptacle 61 is directly mateable, without the use of intervening elements, to the male coupling 62 of the cable 60 such that spaced ones of the sensors 30 can effectively be powered by associated ones of the cable 60. The male receptacle 62 is electrically coupled to the threaded bore 33 and removably mateable with one female coupling 61 of the cable 60. Such female couplings 61 include a cap 63 that can conveniently be removably attached directly, without the use of intervening elements, to a receiving face of the female couplings 61, which is vital for advantageously and effectively shielding the female couplings 61 from undesirable debris during non-operating conditions.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A camouflaged thermo-sensitive sprinkler system for protecting a building structure from wildfire damage, said thermo-sensitive sprinkler system comprising:

a control panel comprising a processor, a memory including programmable software instructions that cause said sprinkler system to automatically toggle between operating and non-operating modes when a fire is detected at the building structure, and a plurality of controls electrically mated to said processor, said controls generating and transmitting a control signal to said processor based upon a user input, said processor executing a control algorithm embedded within said software instructions for enabling the user to manually override said sprinkler system as needed;

a plurality of sensors sequentially spaced along a perimeter of the building structure, each said sensors being camouflaged and shaped as one of an outdoor insect and amphibian for blending into a surrounding environment;

a plurality of lawn sprinkler assemblies selectively positioned at predetermined locations about the perimeter of the building structure;

a plurality of fire sprinkler assemblies selectively positioned at predetermined locations about the perimeter of the building structure, said lawn sprinkler assemblies and said fire sprinkler assemblies being electrically mated to said control panel and further being independently operable during emergency and non-emergency situations;

wherein each said sensors are in communication with said control panel such that said sensors can automatically instruct said control panel to activate and deactivate said lawn and fire sprinkler assemblies when an ambient temperate is detected to be higher than a maximum threshold temperature surrounding the building structure;

at least one elongated and conductive cable including a plurality of female couplings electrically mated thereto and laterally extending away from said cable, said cable further including a male coupling electrically mated thereto;

each said sensors comprising a housing provided with a linear threaded bore, an elongated and linear stake removably inserted below ground level and pivotally connected to said housing, said housing being adaptable along an arcuate path above the ground level while said stake remains statically positioned below ground level, a female receptacle directly mateable to said male coupling of said cable such that spaced ones of said sensors can be powered by associated ones of said cable, and a male receptacle electrically coupled to said threaded bore and removable mateable with one of said female couplings of said cable.

2. The system of claim 1, wherein each said fire sprinkler assemblies comprises:

a plurality of one-way shut-off valves located down stream of a main water supply line; and a plurality of sprinkler heads in fluid communication with said shut-off valves respectively, said sprinkler heads being selectively positioned in a plurality of zones defined about the perimeter of the building structure, each said zones being directly operable by an associated one of said shut-off valves such that selected ones of said zones can be activated as needed.

3. The system of claim 1, wherein each said lawn sprinkler assemblies comprises:

a plurality of one-way shut-off valves located down stream of a main water supply line;

a plurality of sprinkler heads in fluid communication with said shut-off valves respectively, said sprinkler heads being selectively positioned in a plurality of zones defined about the perimeter of the building structure, each said zones being directly operable by an associated one of said shut-off valves such that selected ones of said zones can be activated as needed; and wherein said lawn shut-off valves are connected in series and isolated from said fire shut-off valves such that said lawn and fire shut-off valves can be independently operated and thereby allow corresponding ones of said zones to be independently operated.

4. The system of claim 1, wherein said sensors comprise: thermoelectric sensors for measuring an ambient temperature surrounding the building structure.

5. The system of claim 1 wherein said female couplings comprise: a cap removably attached directly to a receiving face of said female couplings for shielding said female couplings from undesirable debris during non-operating conditions.

6. A camouflaged thermo-sensitive sprinkler system for protecting a building structure from wildfire damage, said thermo-sensitive sprinkler system comprising:

a control panel comprising a processor, a memory including programmable software instructions that cause said sprinkler system to automatically toggle between operating and non-operating modes when a fire is detected at the building structure, a plurality of controls electrically mated to said processor, said controls generating and transmitting a control signal to said processor based upon a user input, said processor executing a control algorithm embedded within said software instructions for enabling the user to manually override said sprinkler system as needed, and an internal power supply source;

a plurality of sensors sequentially spaced along a perimeter of the building structure, each said sensors being camouflaged and shaped as one of an outdoor insect and amphibian for blending into a surrounding environment;

a plurality of lawn sprinkler assemblies selectively positioned at predetermined locations about the perimeter of the building structure;

a plurality of fire sprinkler assemblies selectively positioned at predetermined locations about the perimeter of the building structure, said lawn sprinkler assemblies and said fire sprinkler assemblies being electrically mated to said control panel and further being independently operable during emergency and non-emergency situations;

wherein each said sensors are in communication with said control panel such that said sensors can automatically instruct said control panel to activate and deactivate said lawn and fire sprinkler assemblies when an ambient temperate is detected to be higher than a maximum threshold temperature surrounding the building structure;

at least one elongated and conductive cable including a plurality of female couplings electrically mated thereto and laterally extending away from said cable, said cable further including a male coupling electrically mated thereto;

each said sensors comprising a housing provided with a linear threaded bore, an elongated and linear stake removably inserted below ground level and pivotally connected to said housing, said housing being adaptable along an arcuate path above the ground level while said stake remains statically positioned below ground level, a female receptacle directly mateable to said male coupling of said cable such that spaced ones of said sensors can be powered by associated ones of said cable, and a male receptacle electrically coupled to said threaded bore and removable mateable with one of said female couplings of said cable.

7. The system of claim 6, wherein each said fire sprinkler assemblies comprises:

a plurality of one-way shut-off valves located down stream of a main water supply line; and a plurality of sprinkler heads in fluid communication with said shut-off valves respectively, said sprinkler heads being selectively positioned in a plurality of zones defined about the perimeter of the building structure, each said zones being directly operable by an associated one of said shut-off valves such that selected ones of said zones can be activated as needed.

8. The system of claim 6, wherein each said lawn sprinkler assemblies comprises;

a plurality of one-way shut-off valves located down stream of a main water supply line;

a plurality of sprinkler heads in fluid communication with said shutoff valves respectively, said sprinkler heads being selectively positioned in a plurality of zones defined about the perimeter of the building structure, each said zones being directly operable by an associated one of said shut-off valves such that selected ones of said zones can be activated as needed;

wherein said lawn shut-off valves are connected in series and isolated from said fire shut-off valves such that said lawn and fire shut-off valves can be independently operated and thereby allow corresponding ones of said zones to be independently operated.

9. The system of claim 6, wherein said sensors comprise: thermoelectric sensors for measuring an ambient temperature surrounding the building structure.

10. The system of claim 6, wherein said female couplings comprise: a cap removably attached directly to a receiving face of said female couplings for shielding said female couplings from undesirable debris during non-operating conditions.

11. A camouflaged thermo-sensitive sprinkler system for protecting a building structure from wildfire damage, said thermo-sensitive sprinkler system comprising:

a control panel comprising a processor, a memory including programmable software instructions that cause said sprinkler system to automatically toggle between operating and non-operating modes when a fire is detected at the building structure, a plurality of controls electrically mated to said processor, said controls generating and transmitting a control signal to said processor based upon a user input, said processor executing a control algorithm embedded within said software instructions for enabling the user to manually override said sprinkler system as needed, and an internal power supply source;

a plurality of sensors sequentially spaced along a perimeter of the building structure, each said sensors being camouflaged and shaped as one of an outdoor insect and amphibian for blending into a surrounding environment;

a plurality of lawn sprinkler assemblies selectively positioned at predetermined locations about the perimeter of the building structure;

a plurality of fire sprinkler assemblies selectively positioned at predetermined locations about the perimeter of the building structure, said lawn sprinkler assemblies and said fire sprinkler assemblies being electrically mated to said control panel and further being independently operable during emergency and non-emergency situations, said sensors generating and wirelessly transmitting a detection signal to said control panel wherein said detection signal comprises an RF signal embedded with a data stream that identifies an ambient temperature surrounding the building structure;

wherein each said sensors are in communication with said control panel such that said sensors can automatically instruct said control panel to activate and deactivate said lawn and fire sprinkler assemblies when an ambient temperate is detected to be higher than a maximum threshold temperature surrounding the building structure;

at least one elongated and conductive cable including a plurality of female couplings electrically mated thereto and laterally extending away from said cable, said cable further including a male coupling electrically mated thereto;

each said sensors comprising a housing provided with a linear threaded bore, an elongated and linear stake removably inserted below around level and pivotally connected to said housing, said housing being adaptable along an arcuate path above the ground level while said stake remains statically positioned below ground level, a female receptacle directly mateable to said male coupling of said cable such that spaced ones of said sensors can be powered by associated ones of said cable, and a male receptacle electrically coupled to said threaded bore and removable mateable with one of said female couplings of said cable.

12. The system of claim 11, wherein each said fire sprinkler assemblies comprises:

a plurality of one-way shutoff valves located down stream of a main water supply line; and a plurality of sprinkler heads in fluid communication with said shut-off valves respectively, said sprinkler heads being selectively positioned in a plurality of zones defined about the perimeter of the building structure, each said zones being directly operable by an associated one of said shut-off valves such that selected ones of said zones can be activated as needed.

13. The system of claim 11, wherein each said lawn sprinkler assemblies comprises:

a plurality of one-way shut-off valves located down stream of a main water supply line;

a plurality of sprinkler heads in fluid communication with said shut-off valves respectively, said sprinkler heads being selectively positioned in a plurality of zones defined about the perimeter of the building structure, each said zones being directly operable by an associated one of said shut-off valves such that selected ones of said zones can be activated as needed; and wherein said lawn shut-off valves are connected in series and isolated from said fire shut-off valves such that said lawn and fire shut-off valves can be independently operated and thereby allow corresponding ones of said zones to be independently operated.

14. The system of claim 11, wherein said sensors comprise: thermoelectric sensors for measuring an ambient temperature surrounding the building structure.

15. The system of claim 11, wherein said female couplings comprise: a cap removably attached directly to a receiving face of said female couplings for shielding said female couplings from undesirable debris during non-operating conditions.

* * * * *